United States Patent [19]

Holmes

[11] 4,023,914
[45] May 17, 1977

[54] LOCKING THREAD FORMING TAP

[76] Inventor: Horace D. Holmes, 28576 Green Willow, Farmington Hills, Mich. 48024

[22] Filed: Jan. 15, 1976

[21] Appl. No.: 649,570

[52] U.S. Cl. .................................. 408/220; 85/47
[51] Int. Cl.² ........................................ B23G 5/06
[58] Field of Search .......... 408/215, 219, 220, 222; 10/141, 140; 85/46, 47; 151/22

[56] References Cited

UNITED STATES PATENTS

| 896,503 | 8/1908 | Zogg | 408/220 |
| 1,961,003 | 5/1934 | Lamond | 408/219 |
| 3,125,772 | 3/1964 | Beck | 408/218 |

Primary Examiner—Gil Weidenfeld
Attorney, Agent, or Firm—Thomas N. Young

[57] ABSTRACT

A thread forming tap comprising a shank section, a body section extending longitudinally from the shank section, a helical thread formed on the body section and having radially converging flank portions which define an inclined ramp area arranged at a preselected angle to the axis of the tap and adapted to form a complementary inclined ramp at the root of the thread to be formed by the tap.

30 Claims, 5 Drawing Figures

LOCKING THREAD FORMING TAP

BACKGROUND AND SUMMARY OF THE INVENTION

The present invention is generally directed toward thread forming taps and, more particularly, to a new and improved thread forming tap for use in providing a locking thread form on the interior of a suitable aperture, bore, etc. Toward this end, the tap of the present invention is adapted to form a thread within such a bore having a flat area or ramp located at the thread root. The ramp is located or oriented at a preselected angle relative to the axis of the bore and the particular angle of such ramp is designed so as to allow the threads to be manufactured to normal commercial tolerances and assure that positive contact is made with the crown or crest of the mating thread of the male threaded element inserted into the bore, whereby to positively prevent loosening of the male member relative to the bore under vibrational or other adverse conditions. The angle of the ramp formed on the thread of the tap, and hence the angle of the complementary ramp formed by the tap in a bore may be varied in accordance with the degree of harness of the workpiece in order to achieve optimum locking characteristics. The tap is designed such that the inclined ramp thereof permits free running of the male threaded member relative to the tapped bore until such time as the degree of loading on the male member and workpiece in which the tapped bore is formed reach a predetermined magnitude, whereby the thread crown of the male member moves into contact with the ramp of the threaded bore in the workpiece. Complete tightening of the male threaded member onto the workpiece results in substantially full engagement of the respective thread faces which occurs, for example, in the case of an one-half inch diameter bolt, is subjected to a 90 foot-pound load.

It is accordingly a general object of the present invention to provide a new and improved tap for providing a locking thread form in a suitable aperture, bore, etc.

It is a more particular object of the present invention to provide a tap for forming threads on a female threaded member wherein the threads are provided with an inclined ramp adapted to lockingly engage the crest of the threads of the associated male threaded member such as a screw, bolt or the like.

It is still another object of the present invention to provide a new and improved tap of the above-described type which may be utilized to form threads of optimum locking characteristics commensurate with the material of the workpieces in which the threads are to be formed Other objects and advantages of the present invention will become apparent from the following detailed description, taken in conjunction with the accompanying drawings.

DETAILED DESCRIPTION OF A PREFERRED EMBODIMENT

Figure 1:
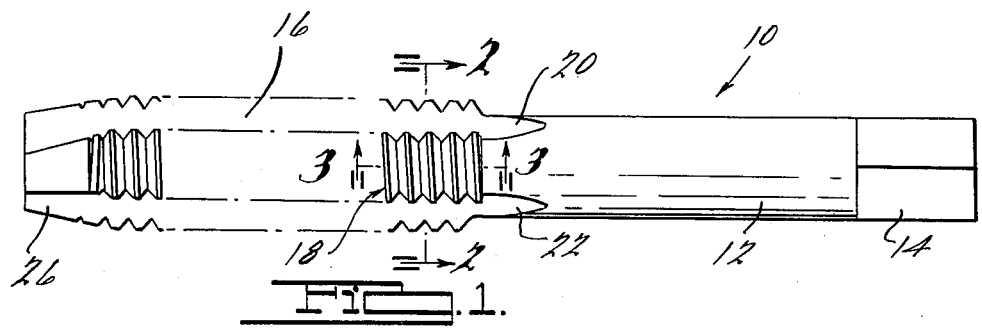
FIG. 1 is a side elevational view of the thread forming tap of the present invention.
Figure 2:
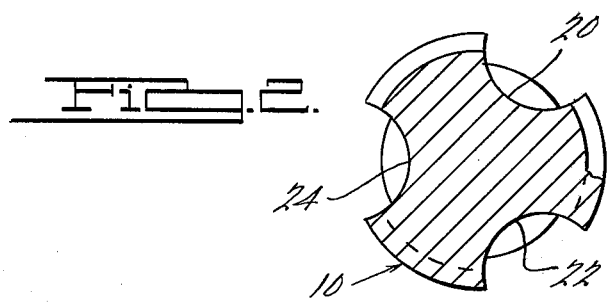
FIG. 2 is an enlarged transverse cross-sectional view taken substantially along the line 2—2 of FIG. 1.

Referring now in detail to the drawing and in particular to FIG. 1 thereof, a helical thread forming tap, generally designated by the numeral 10, is shown as comprising a generally cylindrically-shaped shank section 12 having a tool-engaging end portion 14 at one end thereof. The opposite end of the shank section is provided with a tap body section 16 which is provided with a thread cutting form 18. A plurality of circumferentially spaced longitudinally extending relieved areas 20, 22, 24 are formed in the body section 16 and function generally as an area into which metal chips accumulate during a thread forming operation as is well known in the art. Additionally, the relieved areas 20-24 serve to vent the bottom of blind bores to thereby reduce tap loading as is also well known in the art. The forward (left) end of the tap 10 is provided with a tapered or reduced diameter pilot end portion or nose 26 for properly orienting the tap 10 within a suitable bore in which a thread is to be formed.

Figure 3:
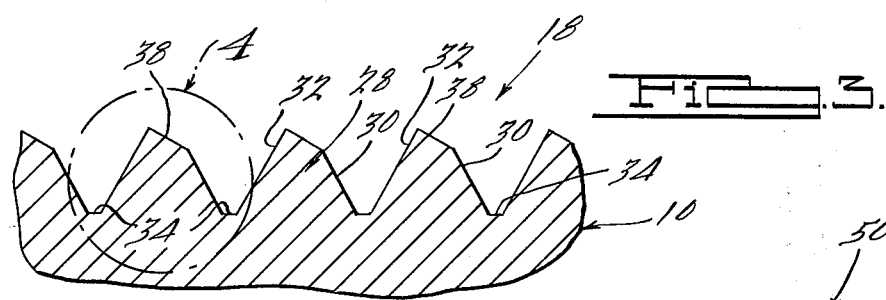
FIG. 3 is an enlarged fragmentary cross-sectional view taken substantially along the line 3—3 of FIG. 1.
Figure 4:
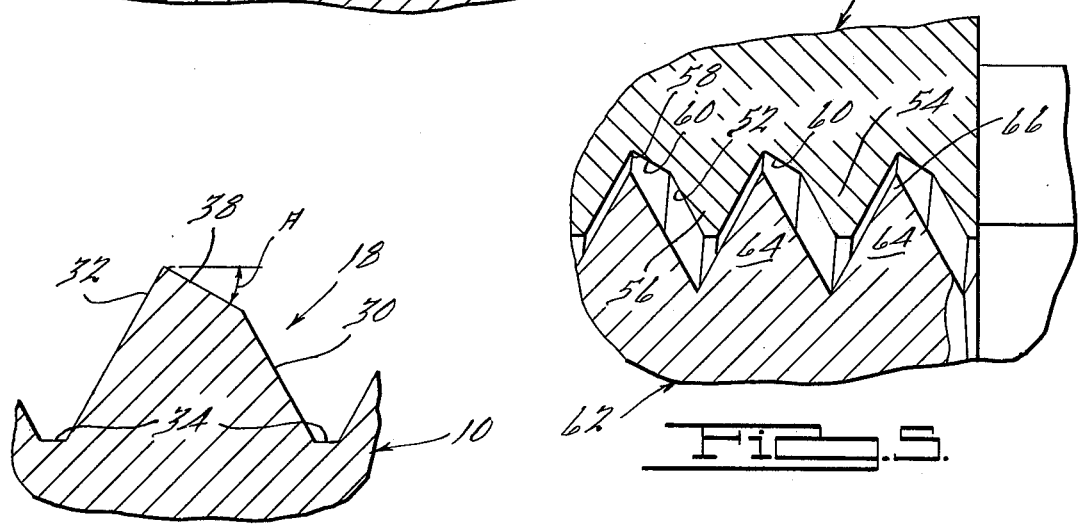
FIG. 4 is an enlarged view of the structure shown within the circle 4 of FIG. 3.

The thread cutting form 18 comprises a helical thread 28 which, as best seen in FIGS. 3 and 4, has radially outwardly converging flanks 30, 32 which define root and crest or crown areas 34 and 36, respectively. In accordance with the principles of the present invention, the crown area 36 of the thread 28 is formed with an inclined ramp 38 which is arranged at a preselected angle A relative to the axis of the tap 10, which angle is selected so as to assure positive engagement of the crest of the associated thread male member with the thread form provided by the tap 10 and consistent with modern manufacturing tolerances. More particularly, it has been found that optimum locking ability between the male and female threaded members can be achieved without sacrificing any strip strength thereof by making the axial length of the ramps formed by the tap ramp 38 approximately 0.020 inches and designing the angle thereof relative to the axis of the tap such that approximately one-half the maximum tolerance between the elements, plus a safety factor of approximately 0.002, is taken up in the aforesaid axial distance of 0.020 inches.

By way of example, for a Standard ⅜ inch nut and bolt having 16 threads per inch, the maximum acceptable diameter limit is 0.3750 inches and the minimum acceptable diameter limit is 0.3595 inches. Taking the difference between these limits, i.e., 0.3750–0.3595 results in 0.0155 which, when added to the aforementioned safety factor of 0.002 (which accommodates for tool wear, etc.) equals 0.0175, and one-half of 0.0175 equals 0.0087. The angle A whose tangent equals 0.0087 ÷ 0.020 is 23.5°. Therefore, the optimum angle at which the ramps 58 should be located relative to axis of the tap 10 where it is desired to take up approximately one-half the total maximum tolerance between the aforementioned size and class threaded elements in a distance of 0.020 is 23.5°. It will be appreciated, of course, that such angle A will vary in accordance with changes in either the safety factor, class threads, number of threads per inch, or diameter of threaded elements. The following chart sets forth acceptable angles of the ramp 38 for the respective size threaded elements, thread class and number of threads per inch, as calculated in accordance with the above example:

| STANDARD SERIES SCREW THREADS | | | | |
|---|---|---|---|---|
| Size Threaded Elements | Threads Per Inch | CLASS 1 Angle Required | CLASS 2 Angle Required | CLASS 3 Angle Required |
| 3/8 | 16 | 23.5±.5° | 17.6±.5° | 15.9±.5° |
| 7/16 | 14 | 25.2±.5° | 18.9±.5° | 17.0±.5° |
| 1/2 | 13 | 26.3±.5° | 19.7±.5° | 17.8±.5° |
| 9/16 | 12 | 27.4±.5° | 20.5±.5° | 18.5±.5° |
| 5/8 | 11 | 28.5±.5° | 21.4±.5° | 19.4±.5° |
| 11/16 | 12 | — | 20.5±.5° | 18.5±.5° |
| 3/4 | 10 | 30.1±.5° | 22.6±.5° | 20.4±.5° |

It is to be noted that the aforesaid angles may vary with the degree of hardness of the material from which the workpiece is fabricated and that the angle A should be increased with an increase in the workpiece hardness in order to achieve optimum locking characteristics.

Figure 5:
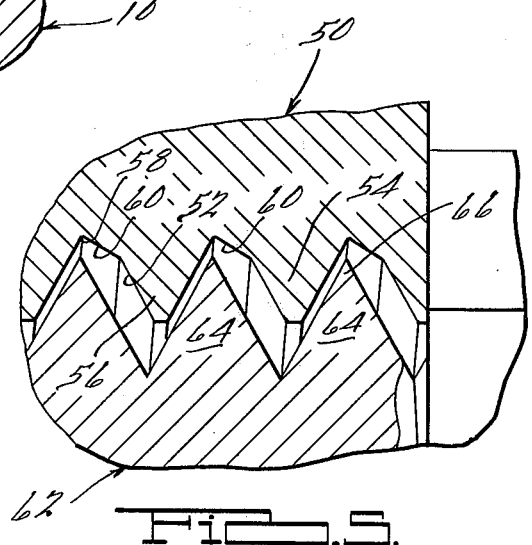
FIG. 5 is a fragmentary cross-sectional view of a threaded bore formed with the tap of the present invention and operatively associated with a typical male workpiece.

FIG. 5 illustrates a typical workpiece 50 which is formed with a bore 52 having a thread form 54 provided by the tap 10. In particular, the thread form 54 consists of a helical thread 56 having a root area 58 which is formed with a ramp 60 that is complementary to and formed by the ramp 38 of the tap 10. The threaded bore 52 is adapted to receive a suitable male threaded member 62 having a Standard external thread 54 which defines a helical crest or crown area 56. When the threaded member 62 is threaded into the bore 52 in the position shown in FIG. 5, the member 62 will be free running, i.e., freely rotatable, until such time as the workpiece 50 and threaded member 62 are subjected to a predetermined magnitude of loading. When this occurs, the crest area 66 of the thread 64 will contact the ramp 60, thereby providing a substantial degree of contact between the respective threads which locks the threaded member 62 within the bore 52. When an increased amount of torsional force is applied, for example, to the member 62, an even greater degree of contact will occur between the crest area 66 and ramp 60 until such time as the faces or flanks of the helical thread 56 engage the thread 64, whereupon any relative lateral movement between the workpiece 50 and thread member 62 is positively prevented so as to assure against loosening thereof.

It is to be noted that while the thread form 18 on the tap 10 is shown herein as being of the Standard type, i.e., American or Unified, the principles of the present invention may be readily applied to various other types of threads such as threads of the "buttress" type. It should also be appreciated that the principles of the present invention as incorporated in the tap 10 could be equally applicable on thread cutting dies for providing locking thread forms on externally threaded members, such as the member 62.

While it will be apparent that the embodiments illustrated herein are well calculated to fulfill the objects above stated, it will be appreciated that the present invention is susceptible to modification, variation and change without departing from the proper scope or fair meaning of the subjoined claims.

I claim:
1. A thread forming tap comprising
a shank section,
a body section extending longitudinally from the shank section,
a helical thread formed on the body section and having radially converging flank portions, an inclined ramp area formed at the end of said flank portions and arranged at a preselected angle to the axis of the tap and adapted to form a complementary inclined ramp at the root of the thread to be formed by the tap,
said thread formed on said body section being of uniform cross-sectional shape for substantially the entire axial length of said body section, and each of said ramp areas being formed at approximately the same angle of inclination from the axis of said tap.

2. The tap as set forth in claim 1 wherein said body is formed with circumferentially spaced longitudinally extending relieved areas.

3. The tap as set forth in claim 1 wherein the end of said body opposite said shank section is formed with a reduced diameter pilot portion.

4. The tap as set forth in claim 1 wherein said preselected angle is between 15° and 35°.

5. The tap as set forth in claim 1 wherein said preselected angle is an angle whose tangent is equal to approximately one-half the maximum standard manufacturing tolerances between the inner periphery of the bore formed by said tap and the outer periphery of a threaded element to be received within said bore in an axial distance of approximately 0.020 inches.

6. The tap as set forth in claim 5 wherein said helical thread on said body section is 3/8 inch in diameter, has 16 threads per inch of class 1 type, and wherein said preselected angle is 23.5 ± 0.5°.

7. The tap as set forth in claim 5 wherein said helical thread on said body section is 3/8 inch in diameter, has 16 threads per inch of class 2 type, and wherein said preselected angle is 17.6 ± 0.5°.

8. The tap as set forth in claim 5 wherein said helical thread on said body section is 3/8 inch in diameter, has 16 threads per inch of class 3 type, and wherein said preselected angle is 15.9 ± 0.5°.

9. The tap as set forth in claim 5 wherein said helical thread on said body section is 7/16 inch in diameter, has 14 threads per inch of class 1 type, and wherein said preselected angle is 25.2 ± 0.5°.

10. The tap as set forth in claim 5 wherein said helical thread on said body section is 7/16 inch in diameter, has 14 threads per inch of class 2 type, and wherein said preselected angle is 18.9 ± 0.5°.

11. The tap as set forth in claim 5 wherein said helical thread on said body section is 7/16 inch in diameter, has 14 threads per inch of class 3 type, and wherein said preselected angle is 17.0 ± 0.5°.

12. The tap as set forth in claim 5 wherein said helical thread on said body section is 1/2 inch in diameter, has 13 threads per inch of class 1 type, and wherein said preselected angle is 26.3 ± 0.5°.

13. The tap as set forth in claim 5 wherein said helical thread on said body section is 1/2 inch in diameter, has 13 threads per inch of class 2 type, and wherein said preselected angle is 19.7 ± 0.5°.

14. The tap as set forth in claim 5 wherein said helical thread on said body section is 1/2 inch in diameter, has 13 threads per inch of class 3 type, and wherein said preselected angle is 17.8 ± 0.5°.

15. The tap as set forth in claim 5 wherein said helical thread on said body section is 9/16 inch in diameter, has 12 threads per inch of class 1 type, and wherein said preselected angle is 27.4 ± 0.5°.

16. The tap as set forth in claim 5 wherein said helical thread on said body section is 9/16 inch in diameter, has 12 threads per inch of class 2 type, and wherein said preselected angle is 20.5 ± 0.5°.

17. The tap as set forth in claim 5 wherein said helical thread on said body section is 9/16 inch in diameter, has 12 threads per inch of class 3 type, and wherein said preselected angle is 18.5 ± 0.5°.

18. The tap as set forth in claim 5 wherein said helical thread on said body section is 5/8 inch in diameter, has 11 threads per inch of class 1 type, and wherein said preselected angle is 28.5 ± 0.5°.

19. The tap as set forth in claim 5 wherein said helical thread on said body section is 5/8 inch in diameter, has 11 threads per inch of class 2 type, and wherein said preselected angle is 21.4 ± 0.5°.

20. The tap as set forth in claim 5 wherein said helical thread on said body section is 5/8 inch in diameter, has 11 threads per inch of class 3 type, and wherein said preselected angle is 19.4 ± 0.5°.

21. The tap as set forth in claim 5 wherein said helical thread on said body section is 11/16 inch in diameter, has 12 threads per inch of class 2 type, and wherein said preselected angle is 20.5 ± 0.5°.

22. The tap as set forth in claim 5 wherein said helical thread on said body section is 11/16 inch in diameter, has 12 threads per inch of class 3 type, and wherein said preselected angle is 18.5 ± 0.5°.

23. The tap as set forth in claim 5 wherein said helical thread on said body section is 3/4 inch in diameter, has 10 threads per inch of class 1 type, and wherein said preselected angle is 30.1 ± 0.5°.

24. The tap as set forth in claim 5 wherein said helical thread on said body section is 3/4 inch in diameter, has 10 threads per inch of class 2 type, and wherein said preselected angle is 22.6 ± 0.5°.

25. The tap as set forth in claim 5 wherein said helical thread on said body section is 3/4 inch in diameter, has 10 threads per inch of class 3 type, and wherein said preselected angle is 20.4 ± 0.5°.

26. A thread forming tool,
    said tool including a body section having a helical thread formed thereon,
    said thread having radially converging flank portions, an inclined ramp area formed at the end of said flank portions and arranged at a preselected angle to the axis of the tool and adapted to form a complementary inclined ramp on the thread to be formed by the tool,
    said thread formed on said body section being of uniform cross-sectional shape for substantially the entire axial length of said body section, and each of said ramp areas being formed at approximately the same angle of inclination from the axis of said tool.

27. A thread forming tool as set forth in claim 26 wherein said body comprises an elongated member having said thread formed on the outer peripery threof.

28. The tool as set forth in claim 27 wherein said body is formed with circumferentially spaced longitudinally extending relieved areas.

29. The tool as set forth in claim 27 wherein the end of said body opposite said shank section is formed with a reduced diameter pilot periphery thereof.

30. The tool as set forth in claim 27 wherein said ramp area is inclined at an angle between 15°–35°.

* * * * *